Patented Feb. 10, 1925.

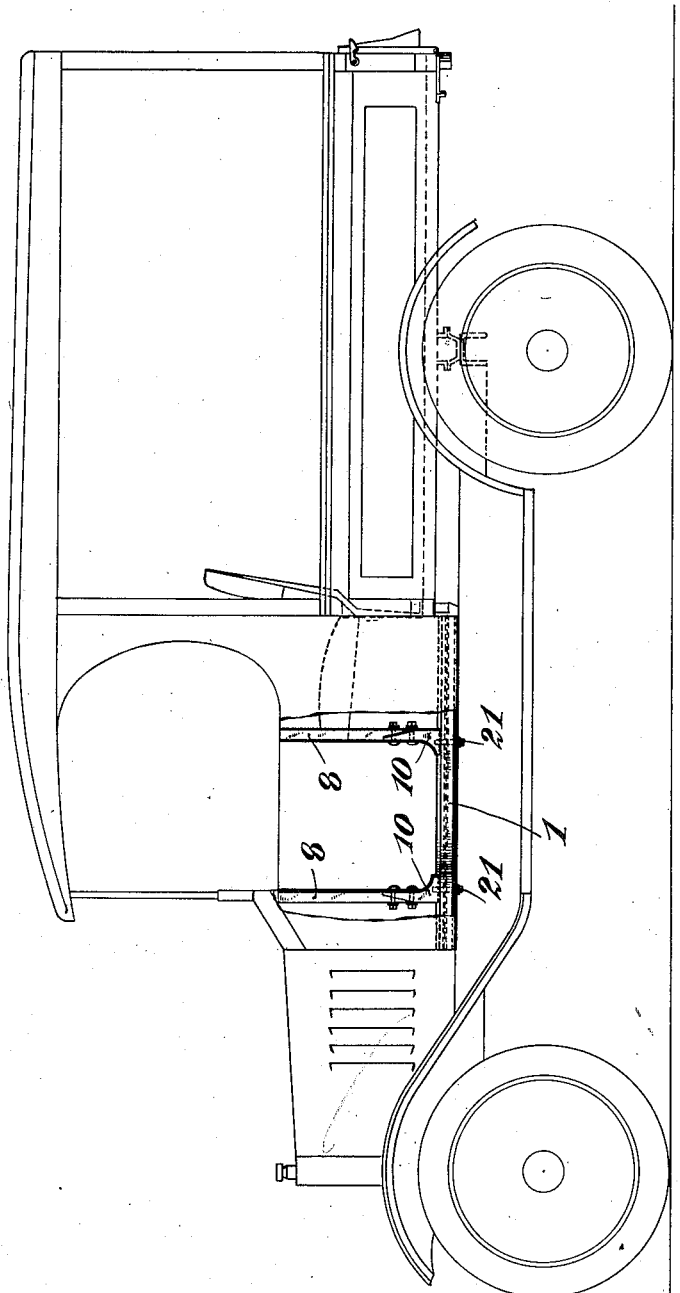

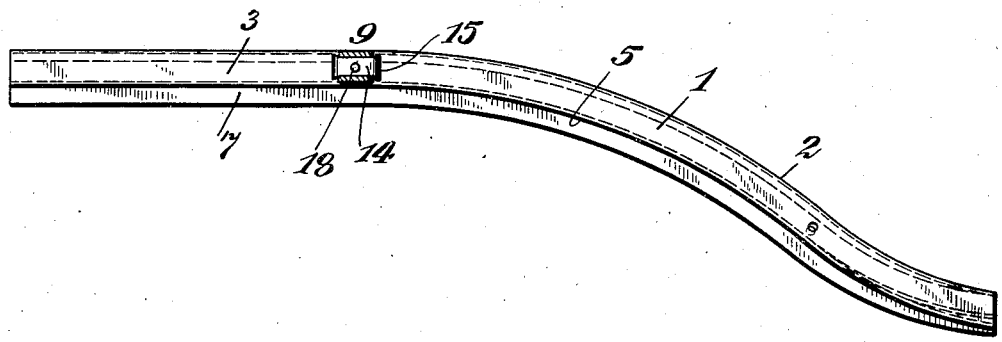
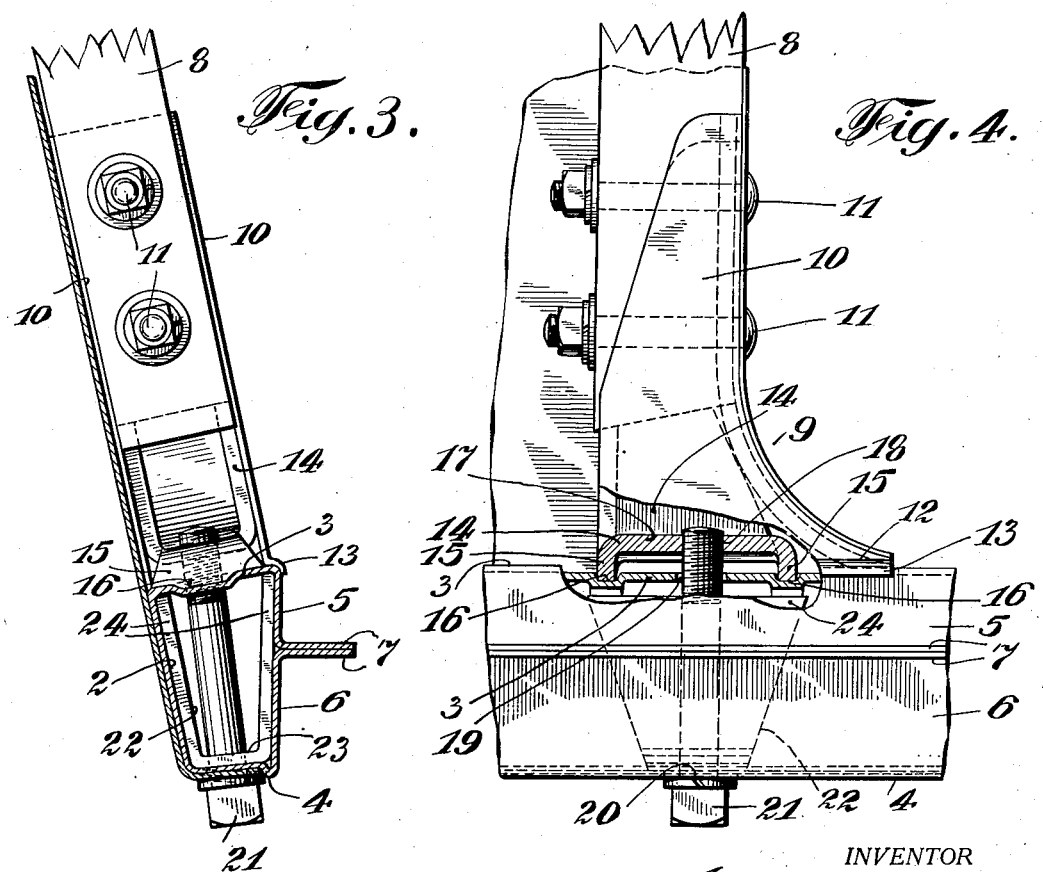

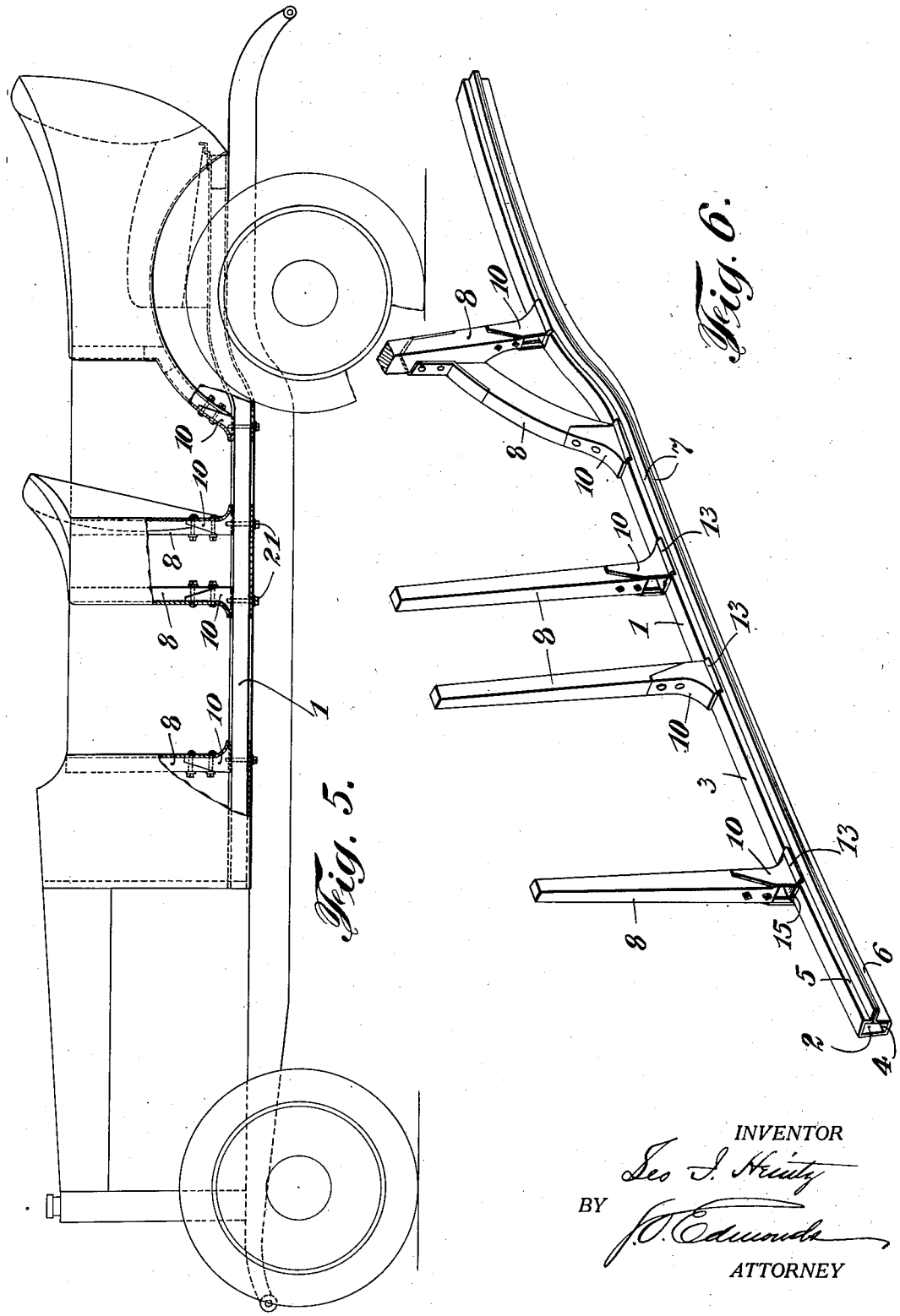

1,525,936

UNITED STATES PATENT OFFICE.

LEO I. HEINTZ, OF PHILADELPHIA, PENNSYLVANIA, ASSIGNOR TO HEINTZ MANUFACTURING COMPANY, OF PHILADELPHIA, PENNSYLVANIA, A CORPORATION OF PENNSYLVANIA.

SILL CONSTRUCTION FOR VEHICLE BODIES.

Application filed April 30, 1923. Serial No. 635,477.

*To all whom it may concern:*

Be it known that I, LEO I. HEINTZ, a citizen of the United States, residing at Philadelphia, in the county of Philadelphia and State of Pennsylvania, have invented certain new and useful Improvements in Sill Construction for Vehicle Bodies, of which the following is a specification.

This invention relates to sill construction for vehicle bodies, and also relates to means for securing body posts to sills.

Combined structural strength and lightness are greatly desired for frame members of vehicle bodies, as well as inexpensive and quick quantity production. It is an object of my invention to provide a sheet metal sill for vehicle body frames, and to provide a sill which has combined structural strength and lightness, and one which may be manufactured quickly and inexpensively. Another object of my invention is to provide means for securing body posts and the like to a sill of such construction. Other objects will be in part obvious and in part pointed out hereinafter.

In accordance with my invention, I provide a sill of hollow, substantially closed, transverse cross-section from end to end, having desired longitudinal curvature, and consisting of a single, integral shaped piece of sheet metal. The sill is an unbroken box-girder, having great structural strength in comparison with its weight, and may be produced quickly and inexpensively in quantities by following a method disclosed and claimed in an application filed by me on even date herewith, Serial No. 635,478. In the present application I claim the sill as an article of manufacture.

In order that a clearer understanding of my invention may be had, attention is hereby directed to the accompanying drawings forming a part of this application and illustrating certain possible embodiments of my invention. Referring to the drawings, Fig. 1 is a side view of a vehicle having the improved sill included in the body construction; Fig. 2 is a top view of the sill; Fig. 3 is a vertical transverse sectional view of the sill, showing one manner of mounting a post thereon; Fig. 4 is a fragmentary side view of the sill and a body post mounted thereon, certain portions being broken away for the sake of clearness; Fig. 5 is a diagrammatic view of a vehicle showing a modified form of sill included in the body thereof; and Fig. 6 is a perspective view of the sill shown in Fig. 5, with body posts attached thereto. Similar reference characters refer to similar parts throughout the several views of the drawings.

Referring to the drawings, the improved sill 1 shown in Figs. 1 and 2 is suitable for use in a vehicle body of the type shown at 2 in Fig 1. This sill is of closed box girder formation from end to end and consists of a single integral piece of sheet metal. The sill has outer wall 2, top wall 3 and bottom wall 4. The inner wall is formed by two portions 5 and 6 which end in horizontal, juxtaposed flanges 7, which are preferably welded or otherwise secured together along their length. Body posts, such as 8, may be secured to such a sill by means of sockets 9, which have a vertical, channel-shaped portion 10 adapted to receive the lower end of post 8 within the channel and in which the post 8 may be secured, as by means of bolts 11. Each socket member is adapted to rest upon the top wall 3 of the sill, as at 12, and along one side edge has a small downwardly extending side flange 13 which overlaps the inner wall 5 of the sill. I secure a U-shaped member 14 in each socket, as by welding the sides of the U-shaped member to the inside of the side walls of the channel socket 9. From the bottom of member 14 preferably extend flanges 15 which are adapted to rest in grooves 16 provided in the top wall 3 of the sill, as by indenting the same. The bottom plate 17 of member 14 is provided with a threaded aperture 18 and the top wall 3 and the bottom wall 4 of the sill is provided with aligned perforations 19 and 20, permitting a bolt 21 to be extended upwardly through the bottom wall 4 and top wall 3 of the sill and into threaded engagement with the hole 18 of member 14, so that by tightening the bolt 21, the socket 9 may be securely fastened in place on the sill. In the interior of the sill, just below member 14, I place a reenforcing member 22, which is preferably U-shaped, having its bottom 23 resting upon the interior surface of bottom sill wall 4 and having its sides 24 lying against and secured to the inner surfaces of the outer and inner sill walls. The sides of member 22 extend up to the top sill wall 3. The bottom of this member 22 is provided with a perforation permitting the bolt 21 to be extended therethrough.

With the construction above described the socket member 9 is securely bound to the sill by means of bolt 21. Sidewise movement of the socket with respect to the sill is prevented by overlapping flange 13. Movement of the socket lengthwise of the sill is prevented by flanges 15 seated in depressions 16 in the sill. Member 22 reenforces the sill at this place. If desired, member 14 may serve as a reenforcing support for the post 8 by abutting the bottom end of said post from below.

The sill 1 illustrated in Figs. 5 and 6 is similar to the sill just described, except that it is suitable for use in a different type of body. In this modification the sill is of greater length and is of different longitudinal curvature. In this type of body similar means for mounting body posts to the sill may be employed.

From the above it will be apparent that the employment of a sill having the structural features above described gives great structural strength with a minimum of weight. Since the sill is of closed box girder formation from end to end, no weak places are present.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. The combination with a sill, of grooves in the top of said sill, a post socket, a member secured to said socket, and downwardly extending flanges on said member seated in said grooves in the sill.

2. The combination with a sill, of grooves in the top of said sill, a post socket, a member secured to said socket, downwardly extending flanges on said member seated in said grooves in the sill, and a bolt engaging said member and sill for securing said socket to said sill.

3. The combination with a hollow sill, of a post socket, a bolt for securing said socket upon said sill, and a reenforcing member within the hollow of said sill and beneath said socket.

4. The combination with a hollow sill, of grooves in the top of said sill, a post socket resting upon the top of said sill, a member secured to said socket, downwardly extending flanges on said member seated in said grooves of said sill, a reenforcing member within the hollow of said sill and beneath said socket, and a bolt for securing said socket to said sill.

5. The combination with a tubular sill, and a post socket, of an attachment piece including a base, upwardly extending flanges secured to the post socket, and downwardly extending flanges seated in depressions in the sill, a U-shaped member within and reenforcing the sill at the depressions, and a bolt extending through the sill, the U-shaped member and the base of the attachment piece, securing the parts together.

This specification signed this 27th day of April, 1923.

LEO I. HEINTZ.